Figure 1:
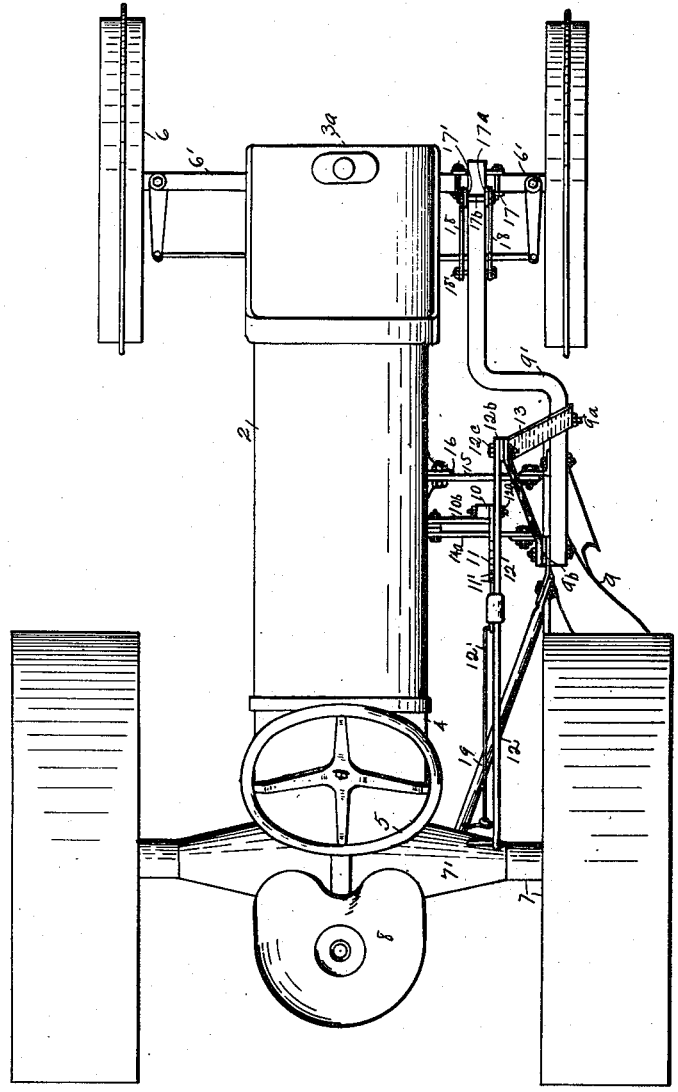

May 6, 1924.　　　　　J. W. GOLDSMITH ET AL　　　　1,492,791
CONTROL FOR TRACTOR DRIVEN PLOWS
Filed Oct. 11, 1922　　　3 Sheets-Sheet 1

Inventor
JAS. W. GOLDSMITH
ORVEL E. GRAVES
By Harry D. Wallace
Attorney

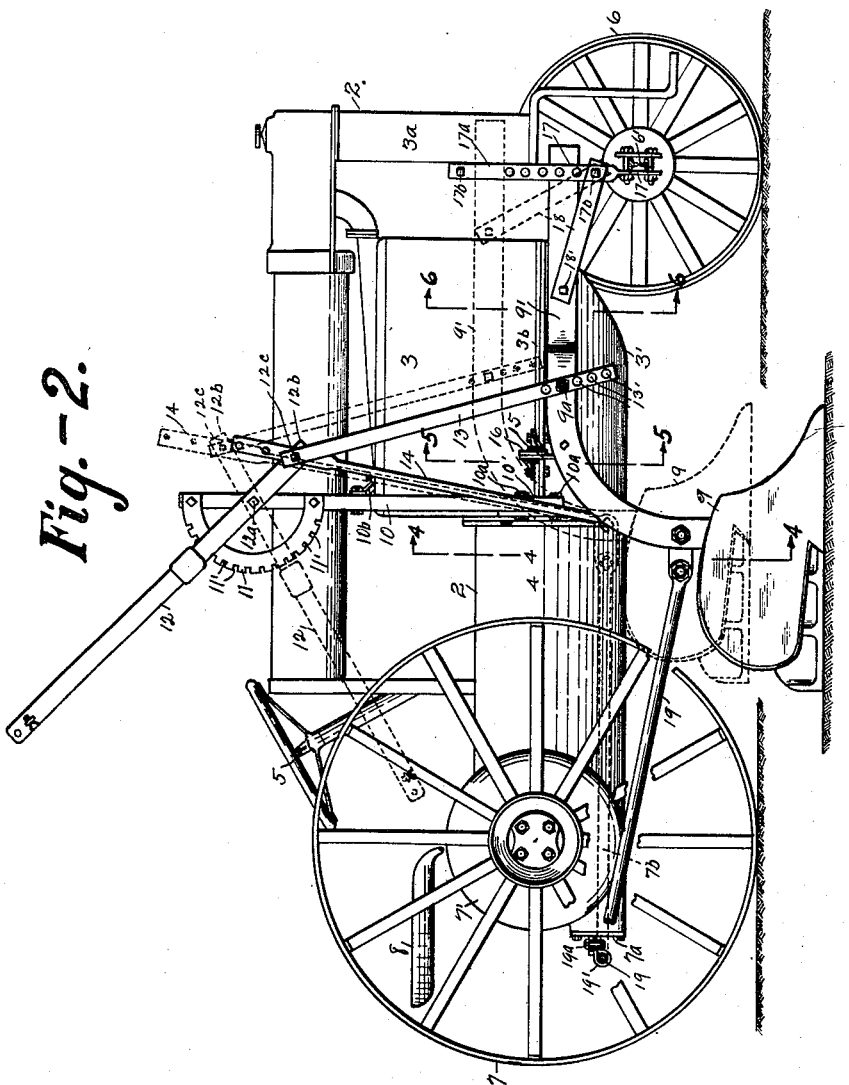

May 6, 1924.
J. W. GOLDSMITH ET AL
1,492,791
CONTROL FOR TRACTOR DRIVEN PLOWS
Filed Oct. 11, 1922   3 Sheets-Sheet 3
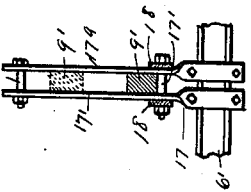
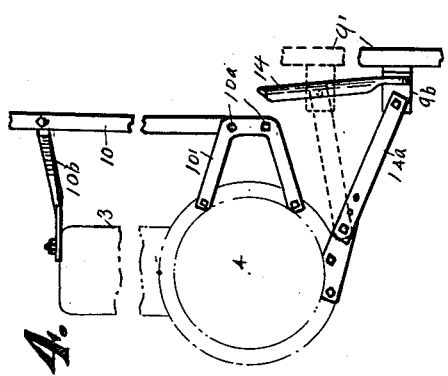
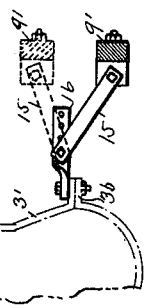
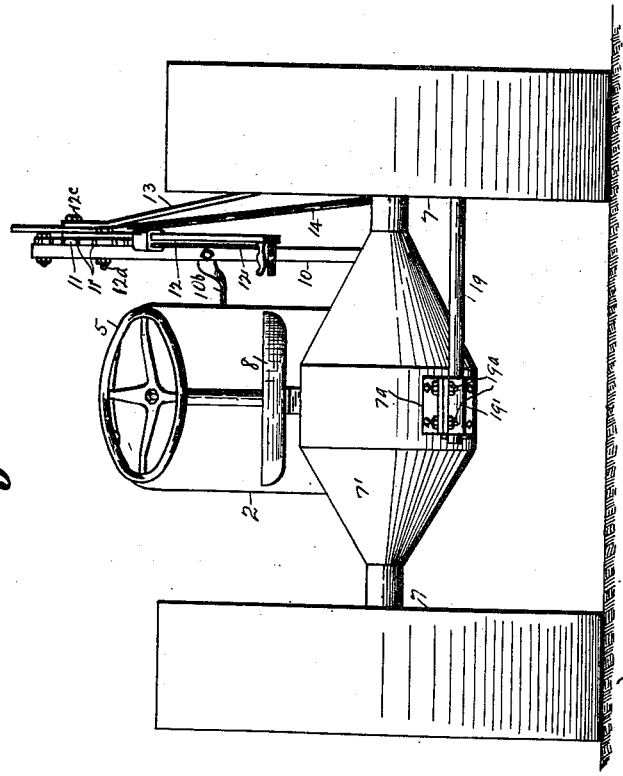
Inventor
JAS. W. GOLDSMITH
ORVEL E. GRAVES
By
Harry D. Wallace
Attorney

Patented May 6, 1924.

1,492,791

UNITED STATES PATENT OFFICE.

JAMES W. GOLDSMITH, OF ROSSVILLE, TENNESSEE, AND ORVEL E. GRAVES, OF LAFAYETTE, GEORGIA.

CONTROL FOR TRACTOR-DRIVEN PLOWS.

Application filed October 11, 1922. Serial No. 593,761.

*To all whom it may concern:*

Be it known that we, JAMES W. GOLDSMITH and ORVEL E. GRAVES, citizens of the United States, residing, respectively, at Rossville, Hamilton County, Tennessee, and Lafayette, in the county of Walker and State of Georgia, have invented certain new and useful Improvements in Controls for Tractor-Driven Plows, of which the following is a specification.

This invention relates to an attachment for farm tractors, particularly of the Fordson type, and has for its object to provide novel and simple mechanism for raising and lowering and for otherwise adjusting and controlling the plows which are operated by said tractors. A particular object is to provide novel manually operable means for adjusting and setting the plow for deep or shallow plowing, while the tractor is in motion. A further object is to provide means for steadying the plow, for preventing wobbling and swaying of the plow laterally, during the plowing operations, and for holding the plow rigid to the rear truck when the tractor is being turned. And a further and general object is to provide a mechanism by which the draft of the cultivating parts may be lightened, thereby saving fuel and reducing wear and tear of the tractor and related parts.

We attain these objects by the means set forth in the detailed description which follows, and as illustrated by the accompanying drawings, in which—

Figure 1 is a top-plan view of the tractor, to which our improvement is applied. Fig. 2 is a side elevation of the same; showing by full and dotted lines the manner of effecting certain adjustments of the plow and its supports. Fig. 3 is a rear-end elevation of the machine. Fig. 4 is a fragmentary vertical cross-section, taken on line 4—4 of Fig. 2; showing the means for attaching and supporting certain parts of the controlling mechanism. Fig. 5 is a similar view, taken on line 5—5 of Fig. 2. And Fig. 6 is a view of the beam-supporting clevis, taken in the direction of the arrows 6—6 in Fig. 2.

In the drawings, 2 represents generally a Fordson tractor; 3 is the motor, by which the tractor is driven; 3' is the crank-case; 4 is the transmission housing, and 5 is the steering-wheel. 6 represents the front truck including the axle 6'; 7 is the rear truck including the housing 7' for the differential and rear axle; 7ª is the draw-bar cap, and 8 is the driver's seat.

The reference numeral 9 represents a common plow, such as is usually employed in connection with farm tractors of the class, for "breaking" the ground, and 9' is the beam which supports and draws the plow. The beam 9', as shown in the drawings, curves upwardly and laterally and forwardly from the plow 9, and its free end is usually pivotally secured to the axle 6', between the adjacent front wheel and the radiator 3ª. The plow 9 is usually positioned between the front and rear wheels, at the right-hand side of the tractor, and during the plowing operations, the plow 9 trails, or is dragged along, and by reason of the aforesaid pivotal connection of the beam 9' with the front axle 6', the plow tends to substantially follow the line of travel of the tractor. Heretofore, the plows, as 9, have had no other connections with the tractor than as described, and being free to wobble and sway from side to side, as well as to teeter and vibrate vertically, because of the lack of suitable controlling and steadying means, the work of the older plows has been more or less irregular and unsatisfactory. The present invention has for its particular object to provide a novel and simple mechanism that effectually overcomes the said difficulties and troubles, which will now be described in detail:

The reference numeral 10 represents a standard, which is positioned forwardly of the driver's seat, preferably between the plow 9 and the crank-case, and is rigidly secured to a bracket 10', by bolts 10ª, the said bracket being conveniently secured to the forward end of the transmission housing 4. The medial portion of the standard 10 is preferably tied to the motor casing, by a stiff brace 10ᵇ (see Fig. 4). Near the top-end of the standard 10 is mounted a quadrant or circular rack 11, having a series of peripheral notches 11', which are engaged by a latch 12' carried by a hand-lever 12 (see Fig. 1), for holding the lever in different positions. The lever 12 is pivoted to the standard 10 concentric to the rack 11, by a bolt 12ª. The forward end 12ᵇ of the lever 12 is pivoted by a bolt 12ᶜ to the upper end of a link 13, the lower end of said link being pivoted to the beam 9' by a bolt 9ª. The said lower end is provided with a number of perforations 13' for rendering the link adjustable relatively to the beam. The end 12ᵇ of the lever 12 also connects by the bolt 12ᶜ with the upper end of a second link 14 which is arranged for adjustment, the lower end of the latter link being pivotally connected to a lug 9ᵇ carried by the beam 9' (see Figs. 1, 4 and 5). By this construction and arrangement the rocking of the hand-lever 12 on the pivot 12ᵃ, as shown by the full and dotted lines in Fig. 2, correspondingly raises and lowers the plow 9 and the beam 9', as shown at the bottom of Fig. 2. The portion of the beam adjacent the lug 9ᵇ is yieldably tied to the transmission housing 4, by means of a short link 14ᵃ, as best seen in Figs. 1 and 4. The large number of the notches 11' in the quadrant 11, provides a relatively broad range of adjustment for the plow, in a vertical plane, for regulating the depth of the plowing. The lever 12 and the links 13 and 14 also afford a ready and convenient means for lifting the plow clear of the earth, for facilitating the turning of the vehicle, as well as the moving of the same from place to place when the plow is idle. To further hold the plow 9 and the beam 9' from too free lateral movement, we provide a tie 15, which is pivotally connected to the beam 9', and also to a link 16, which is pivotally connected to the flange 3ᵇ of the crankcase 3' (see Figs. 1, 2 and 5). The disposition and arrangement of the tie 15 and the link 16 are such that, the plow and beam may be moved vertically, to the extent shown in Figs. 2, 4 and 5. But the said parts tend to prevent the lateral swaying and straining of the plow and beam, which is the end sought. The forward end of the beam 9', in the present case, is adjustably disposed and held between similar parallel upright members 17' and 17ᵃ of a clevis 17, whose lower ends are clamped to the front axle 6', by any suitable means. The members 17' and 17ᵃ are correspondingly perforated at frequent intervals as shown, for varying the aforesaid adjustment of the beam relatively to the axle 6'. The clevis 17 is also connected to the beam, at a point intermediate the axle 6' and the link 13, by a pair of links 18, the latter being pivotally attached to the beam by a bolt 18'. By the provision of the links 18 the beam may be adjusted vertically in the clevis within a certain range by means of pins 17ᵇ, as shown by the full and dotted lines in Figs. 2 and 6. In order to suitably brace and steady the plow 9, as well as to prevent undue strains when the tractor is turned towards the right or left, we provide an anchor rod 19, the forward end of which is pivotally connected to the beam 9', while the rear end of said rod is pivotally secured to the cap 7ᵃ of the draw-bar 7ᵇ, by a loop-bracket 19', which is held in place by bolts 19ᵃ. The pivotal nature of the brace 19 allows the plow 9 to be freely raised and lowered, as indicated by the full and dotted lines in Fig. 2. The brace 19 co-operates with the braces 14ᵃ, 15 and 16 for preventing the lateral swaying or rocking of the plow and its beam, and tends to restrict all horizontal movements of the plow to those of the body of the tractor and the rear truck, rather than to the more pronounced pivotal actions of the forward truck, which may be effected during the turning movements, while the plow is performing its work, as shown by the full lines at the bottom of Fig. 2. By the foregoing construction and arrangement of the parts, the tortuous furrows cut by the plow 9 will be substantially the same breadth as the straight furrows. This not only tends to reduce the power requirements of the motor and lessens the consumption of fuel, and the general wear and tear of the tractor and related parts, but also effects the more even and perfect plowing of a field. Our attachment when properly constructed and applied, enables the driver of the tractor to readily and quickly adjust the plow for deep or shallow plowing, in addition to giving him complete control of all of the working parts of the tractor.

Having thus described our invention, what we claim, is—

1. The combination with a tractor including the motor and the running-gear, and a plow including the beam driven by the tractor, of a hand-lever pivotally supported by the body of the tractor, adapted to be adjusted and set in different positions, and a pair of links connected at one end to a common point of the hand-lever and having their opposite ends connected to the plow-beam at longitudinally spaced points to bodily raise and lower the plow by the vertical rocking of said hand-lever.

2. The combination with a tractor including the motor and the running-gear, and a plow including a beam, driven by the tractor, of a standard rigidly supported by the body of the tractor, a circular rack carried by the standard, a hand-lever pivoted to the standard concentric to said rack, and a pair of links carrying the beam for bodily movement and pivotally connecting the hand-lever with said beam adapted to raise and lower said plow by the rocking of the hand-lever.

3. The combination with a tractor, including the motor and the running gear, and a plow driven thereby, of a standard rigidly supported by the body of the tractor and supporting a quadrant, a hand-lever pivoted to the quadrant adapted to be held in different positions by the quadrant, a pair of links interposed between said hand-lever and the beam of the plow adapted to bodily raise and lower the plow and beam by the rocking of said hand-lever, and a clevis for adjustably securing the plow-beam to the forward axle of the running-gear and guiding said beam in its bodily movement.

4. The combination with a tractor including the motor, the running-gear, the drawbar and a plow including the beam drawn by the tractor, of a standard rigidly supported by the body of the tractor, a circular rack carried by the standard, a hand-lever pivoted to the standard and operatively connected to said rack, a pair of links for connecting said hand-lever with said beam adapted to raise and lower the plow by the rocking of said lever vertically, and means for connecting the plow-beam to said drawbar for preventing straining of the plow when the tractor is turning.

5. The combination with a tractor, including the motor and the running-gear, and a plow driven thereby, of a quadrant supported by the body of the tractor, a hand-lever pivoted to the quadrant adapted to be held in different positions thereby, a pair of links supporting the beam from the hand-lever and adapted to raise and lower the plow and beam by the rocking of said hand-lever, a clevis for adjustably securing the plow-beam to the forward axle of the running-gear, and means for preventing the lateral wobbling and swaying of the plow.

6. The combination with a tractor including the motor and the running-gear, and a plow driven by the tractor, of a standard rigidly supported by the body of the tractor, a hand-lever rockably supported by the standard, a latch for holding the hand-lever in different positions, beam-supporting means connecting said hand-lever with different parts of the plow-beam whereby the rocking of the hand-lever effects the raising and lowering of the plow, means pivotally connecting the beam of the plow to the body of the tractor for preventing wobbling and swaying of the beam, and means for adjustably connecting the beam to the forward axle of the running-gear.

7. The combination with a tractor, a plow and plow beam, means for bodily raising and lowering the plow, and means for guiding the plow in its vertical movement including a pair of links pivoted at their opposite ends to the tractor and plow beam for swinging in parallel planes.

8. The combination with a tractor, a plow and plow beam, means for bodily raising and lowering the plow, and substantially parallel links pivotally connected to the tractor and the plow beam for guiding the plow in its vertical movement and laterally spacing the beam from the tractor.

9. The combination with a tractor, a plow and plow beam, means for bodily raising and lowering the plow, a forward link pivotally connected at one end to the tractor and at its opposite end to the forward part of the plow beam, and a rear link pivotally connected at its forward end to the rear part of the plow beam and at its rear end to the tractor.

10. The combination of a tractor, a plow and plow beam, a forward link pivotally connected at one end to the tractor and at its opposite end to the plow beam; a rear link pivotally connected at one end to the rear part of the plow beam and at its opposite end to the tractor, and adjustable means secured to the plow beam intermediate the forward and rear links for bodily raising and lowering the plow.

11. The combination with a tractor, a plow and plow beam, means for bodily raising and lowering the plow, and a spacing link laterally spacing the plow beam from the tractor and pivotally connected at its opposite ends to the said plow beam and tractor.

12. In combination with a tractor, a plow having its beam extending forwardly over the front axle of the tractor, a pair of uprights on the front axle between which the forward end of the beam is guided, and means for bodily raising and lowering the plow.

13. In combination with a tractor, a plow having its beam extending forwardly over the front axle of the tractor, a pair of uprights on the front axle between which the forward end of the beam is guided, link means pivoted at one end to the beam and at its opposite end to the uprights, a link pivotally connecting the beam to the tractor and laterally spacing the one from the other.

In testimony whereof we affix our signatures.

JAMES W. GOLDSMITH.
ORVEL E. GRAVES.